United States Patent [19]

Schafer

[11] 4,046,865
[45] Sept. 6, 1977

[54] PROCESS FOR PRODUCING SODIUM CHLORIDE BRINES SUITABLE FOR ELECTROLYSIS

[75] Inventor: Rolf Schafer, Krefeld-Uerdingen, Germany

[73] Assignee: Bayer Aktiengesellschaft, Germany

[21] Appl. No.: 744,088

[22] Filed: Nov. 22, 1976

Related U.S. Application Data

[63] Continuation of Ser. No. 451,993, March 18, 1974, abandoned.

[30] Foreign Application Priority Data

Mar. 22, 1973  Germany ............................ 2314255

[51] Int. Cl.$^2$ ............................................. C01D 3/06
[52] U.S. Cl. .................... 423/499; 423/186; 423/193
[58] Field of Search ............... 423/499, 179, 201, 186, 423/193

[56] References Cited

U.S. PATENT DOCUMENTS

| 623,295 | 4/1899 | Vis | 423/499 X |
|---|---|---|---|
| 2,191,411 | 2/1940 | Pierce, Jr. | 423/193 |
| 2,433,601 | 12/1947 | Comstock | 423/186 |
| 2,521,459 | 9/1950 | Hunter | 423/499 X |
| 2,764,472 | 9/1956 | Cady et al. | 423/499 X |
| 3,130,016 | 4/1964 | Grier | 423/179 |
| 3,241,929 | 3/1966 | Jordan et al. | 423/179 |
| 3,800,026 | 3/1974 | Morgan | 423/499 |

FOREIGN PATENT DOCUMENTS

| 885,913 | 11/1971 | Canada | 423/499 |
|---|---|---|---|

*Primary Examiner*—Edward Stern
*Attorney, Agent, or Firm*—Connolly and Hutz

[57] ABSTRACT

Contacting rock salt containing at least one member of the group consisting of anhydrite and calcium sulfate as an impurity with an aqueous sodium chloride solution initially containing from about 200 to about 300 g/l of sodium chloride and having a calcium ion concentration of 0.01 to 0.5 g/l and a sulfate ion concentration of 0.1 to 15 g/l, the multiplication product of said calcium ion concentration and said sulfate ion concentration having a maximum value of 2, and discontinuing said contact after the sodium chloride brine has formed.

5 Claims, No Drawings

PROCESS FOR PRODUCING SODIUM CHLORIDE BRINES SUITABLE FOR ELECTROLYSIS

This application is a continuation of application Ser. No. 451,993 filed Mar. 18, 1974 and now abandoned.

When rock salt is dissolved to form a substantially saturated solution, some of the impurities present are also dissolved. Accordingly, additional purifying operations are required in order to produce a pure brine. Even in those cases where a certain level of impurities can be accepted in the brine, this applies and it applied in particular to recycle processes in which only sodium chloride is partly removed from the solution and the dilute solution is subsequently resaturated with solid salt.

Accordingly, in the electrolysis of alkali metal chlorides by the amalgam process impurities are removed before electrolysis. Magnesium and iron are normally precipitated and separated off with sodium hydroxide, calcium with sodium carbonate and sulphate with barium compounds. Sodium hydroxide and sodium carbonate are used in excess in order to obtain as complete a precipitation as possible of calcium, iron and magnesium. Barium is used in a deficit, based on the quantity of sulphate dissolved in the brine, because a sulphate level of a few grams per liter in the brine is acceptable and since the barium compound is intended to be fully utilised by the excess sulphate in the brine. This process is known as full-stream purification and has been in operation for many years. Unfortunately, the consumption of barium has an adverse effect upon the economy of the process when the salts have a high sulphate content. There have been numerous attempts to reduce the consumption of barium. Dissolution of the readily soluble and fast-dissolving impurities such as potassium sulphate and sulphate-containing double salts cannot be prevented. However, anhydrite has both a relatively low solubility and a low rate of dissolution. The low dissolution rate can be utilised and the finely ground salt quickly dissolved, most of the anhydrite being subsequently isolated, by rapid phase separation (German Offenlegungsschrift No. 1,467,222). Unfortunately, this process involves the use of expensive apparatus.

It is also possible to utilise the relatively low solubility of the anhydrite and to dissolve it with a brine which is already saturated or oversaturated with anhydrite (U.S. Patent Specification No. 2,787,591 and German Offenlegungsschrift No. 2,127,438). These processes differ from one another in the concentrations of calcium and sulphate in the brine. It is possible to adjust either relatively high sulphate contents and relatively low calcium contents (German Offenlegungsschrift No. 2,127,438) or vice versa (U.S. Patent Specification No. 2,787,591). The only condition is that the solubility product of the anhydrite must be exceeded. Processes employing anhydrite- saturated brine have various disadvantages and they have never been widely adopted in practice. High sulphate contents give rise to fairly serious anode burnup in the case of graphite anodes and to relatively high oxygen contents in the chlorine, whilst high calcium contents can seriously interfere with the operation of the cell. The processes have to be strictly controlled because, on the one hand, the solubility of anhydrite has to be reached or exceeded whilst, on the other hand, the slightly higher solubility of gypsum must not be reached because gypsum would be precipitated, giving rise to serious operational disturbances. This danger is particularly acute when the rock salt also contains readily soluble calcium or sulphate compounds, for example polyhalite $K_2SO_4 \cdot MgSO_4 \cdot 2 CaSO_4 \cdot 2 H_2O$. Both the solubility of anhydrite and the solubility of gypsum are controlled to various extents by the temperature and the salt concentration, and both parameters are subject to changes in the brine circuit. Accordingly, any economic advantages of these processes are offset by reduced operational safety to such an extent that these processes have not been successfully adopted in practice.

It has now been found that a sodium chloride brine suitable for the electrolysis of sodium chloride can be produced from rock salt containing anhydrite and/or calcium sulphate by treating the rock salt with an aqueous solution initially containing from about 200 to about 300 g/l of sodium chloride and having a calcium ion concentration of 0.01 to 0.5 g/l and a sulphate ion concentration of 0.1 to 15 g/l, the multiplication product of the calcium ion concentration and the sulphate ion concentration having a maximum value of 2, and discontinuing said contact after the sodium chloride brine has formed.

Surprisingly, it has been found that the dissolution of anhydrite can largely be prevented, even in solutions which are considerably undersaturated with anhydrite, by adjusting the calcium ion concentration in the aqueous sodium chloride solution to a value of from 0.01 to 0.5 g/l, preferably from 0.05 to 0.2 g/l and the sulphate ion concentration to a value of 0.1 to 15 g/l, preferably 2 to 8 g/l. The calcium ion concentration is advantageously adjusted by the addition of barium carbonate and/or sodium carbonate. The sulphate ion concentration can be adjusted by the addition of ionic carbonate-free barium compounds, for example barium chloride, or by the addition of mixtures of barium compounds, such as barium carbonate and barium chloride.

Since the dissolution of anhydrite can largely be prevented by the process according to the invention, even in brines which are considerably undersaturated with anhydrite, a considerable saving of barium carbonate and sodium carbonate is possible compared with conventional processes. Accordingly, the process according to the invention largely prevents the dissolution of anhydrite without having any of the disadvantages of conventional processes. It does not require the use of a complicated apparatus for rapid dissolution and phase separation and high impurity levels in the brine are not able to interfere with the electrolysis cell operation. It is not possible to provide a theoretical explanation as to why the dissolution quota of the anhydrite is so drastically reduced in accordance with the invention inspite of the contact time between the anhydrite and the non-anhydrite-saturated brine being several hours.

The process according to the invention is illustrated in the following Examples:

EXAMPLE 1

In this test, anhydrite that had remained undissolved following the treatment of rock salt with brine, rather than rock salt itself was subjected to treatment with brines which differed in their calcium ion content. The brine contained 300 g/l of sodium chloride, 2 g/l of sulphate, 40 mg/l of sodium hydroxide. In order to determine what influence a certain calcium ion content in the brine has upon the dissolved quantity of anhydrite, the calcium ion content in the brine was varied as follows:

Case 1: Adjustment to a calcium ion content of approximately 5 mg/l by the addition of 200 mg/l of sodium carbonate Case 2: Adjustment to a calcium ion content of 250 mg/l of calcium by the addition of calcium chloride;

Case 3: Adjustment to a calcium ion content of 500 mg/l of calcium by the addition of calcium chloride.

In all three cases, the anhydrite was stirred with the brine for 30 minutes at 70° C. The quantity of anhydrite was measured in such a way that, even with complete dissolution, there was still no anhydrite saturation (200 mg of anhydrite per liter of brine). Thereafter the undissolved fraction of calcium sulphate was filtered off and determined in each individual case. The following proportions of the anhydrite used remained undissolved:

Case 1: 46.8 %;
Case 2: 93.5%;
Case 3: 93.5 %.

The procedure adopted in Case 1 corresponds to conventional full-stream purification.

EXAMPLE 2

A rock salt with a total sulphate content of from 0.8 to 1 % by weight was treated with a rock salt brine containing approximately 300 g/l of sodium chloride. Of the total sulphate content, half was contributed by anhydrite. In conventional full-stream purification with a sodium carbonate excess of about 350 mg/l and a sulphate level of about 4 g/l, barium carbonate had to be added at a rate of about 300 kg per hour and soda at a rate of about 125 kg per hour for a certain apparatus load factor. According to the invention, it is possible by shutting off the supply of sodium carbonate by adjusting the calcium ion content in the brine to a value of from 30 to 250 mg/l by the addition of barium carbonate, to reduce the dissolved quantity of anhydrite to one third of that of the conventional process. The addition of barium carbonate amounted to only 200 kg per hour.

EXAMPLE 3

It is of advantage to replace a small fraction of the barium carbonate with barium chloride. In the test, the barium chloride was not used as such, but was prepared in a mixing vessel from barium carbonate and hydrochloride acid. It is possible to control the calcium content of the brine by varying the quantity of barium and carbonate or its carbonate fraction to control the sulphate level if the dissolved sulphate fraction is higher in molar terms than the dissolved calcium fraction, which can be the case for example in the dissolution of relatively samll quantities of potassium sulphate, by varying the quantity of barium chloride. The sulphate content of the brine was varied from 2 to 5 g/l by the addition of barium chloride, and the calcium level from 10 to 400 mg/l by the addition of barium carbonate without any significant differences being observed in the dissolution quota of the anhydrite. The dissolved quantity of anhydrite amounted on average to about 20 % by weight.

EXAMPLE 4

In a long-term practical test, sulphate ion contents or less than 4 g/l and calcium ion contents of less than 250 mg/l were adjusted in the brine. Anhydrite saturation is by no means reached with these concentrations. The undissolved calcium sulphate can be removed from the system with the precipitated calcium carbonate/barium sulphate mixture. The anhydrite crystals (undissolved component) are clearly visible in microphotographs of the sludge. The specific consumption of barium carbonate can be reduced by about 40 to 45 % of the consumption of conventional full-stream purification. According to the invention, dissolution of the anhydrite component can be reduced by 80 to 90 %.

What is claimed is:

1. In the process for producing sodium chloride brine having a calcium sulfate concentration suitable for use in the electrolysis of sodium chloride wherein rock salt containing calcium sulfate as an impurity is contacted with an aqueous sodium chloride solution the improvement which comprises contacting said rock salt with an aqueous sodium chloride solution initially containing from about 200 to about 300 g/l of sodium chloride and having a calcium ion concentration of 0.01 to 0.5 g/l and a sulfate ion concentration of 2 to 15 g/l for a contact time of at least thirty minutes and until sodium chloride brine having a calcium sulfate concentration suitable for use in said electrolysis is formed, the multiplication product of said calcium ion concentration and said sulfate ion concentration having a maximum value of 2, discontinuing said contact and removing undissolved calcium sulfate.

2. The process of claim 1 wherein said aqueous sodium chloride solution initially has a calcium ion concentration of 0.05 to 0.2 g/l and a sulfate ion concentration to 2 to 8 g/l.

3. The process of claim 1 wherein the initial calcium ion concentration of said aqueous sodium chloride is adjusted by the addition of at least one member selected from the group consisting of barium carbonate and sodium carbonate and the resulting precipitated calcium carbonate is then removed.

4. The process of claim 1 wherein the initial sulfate ion concentration of said aqueous sodium chloride solution is adjusted by the addition of ionic carbonate-free barium compounds and then the resulting precipitated barium sulfate is removed.

5. The process of claim 1 wherein the initial sulfate ion concentration of said aqueous sodium chloride solution is adjusted by the addition of at least one member selected from the group consisting of barium carbonate and barium chloride and then the resulting precipitated barium sulfate is removed.

* * * * *